(12) United States Patent
Jones et al.

(10) Patent No.: US 10,364,934 B1
(45) Date of Patent: Jul. 30, 2019

(54) SUPPORT STRUCTURE FOR SUPPORTING A CONDUIT OF AN ENGINE

(71) Applicant: Caterpillar Inc., Deerfield, IL (US)

(72) Inventors: Douglas E. Jones, Lafayette, IN (US); Darwin A. Garrison, Lafayette, IN (US); Nicolae C. Pelei, Lafayette, IN (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 16/102,779

(22) Filed: Aug. 14, 2018

(51) Int. Cl.
*F16L 3/22* (2006.01)
*F16M 13/00* (2006.01)
*F16M 7/00* (2006.01)

(52) U.S. Cl.
CPC ............ *F16M 13/005* (2013.01); *F16M 7/00* (2013.01)

(58) Field of Classification Search
CPC ..... F16M 13/005; F16L 55/035; B60K 11/00; B60K 6/405
See application file for complete search history.

(56) References Cited

U.S. PATENT DOCUMENTS

| | | | |
|---|---|---|---|
| 6,769,635 B2 | 8/2004 | Stewart et al. | |
| 6,886,762 B2 | 5/2005 | Angelino et al. | |
| 6,945,475 B2 | 9/2005 | Lawrence et al. | |
| 7,134,615 B2 | 11/2006 | Lawrence | |
| 7,556,017 B2 | 7/2009 | Gibson | |
| 8,876,119 B2 * | 11/2014 | Braun | B60K 11/00 180/69.22 |
| 2008/0142647 A1 * | 6/2008 | Connelly | F16L 55/035 248/74.1 |
| 2016/0024990 A1 * | 1/2016 | Maier | F01N 13/1811 60/323 |
| 2019/0001806 A1 * | 1/2019 | Takami | B60K 6/405 |

FOREIGN PATENT DOCUMENTS

| | | |
|---|---|---|
| CN | 105464865 | 11/2017 |
| DE | 10323871 | 8/2004 |

OTHER PUBLICATIONS

Ryerson's International Hyperloop Team, Inspire Solid Thinking.
B. Sreedhar, Optimization of Mounting Bracket, 4 pages, India.

* cited by examiner

*Primary Examiner* — Amy J. Sterling (57) ABSTRACT

A support structure for supporting a conduit of an engine includes a bracket assembly having a platform, a pair of brackets, and a pair of fixtures. The platform supports the conduit. Each bracket includes a first lateral post coupled to the platform, a second lateral post coupled to an engine block, a first longitudinal post, and a second longitudinal post. Also, a lateral distance between the first longitudinal post and the second longitudinal post increases in a direction away from the first lateral post towards the second lateral post. Each bracket also includes a stiffener connecting the first longitudinal post and the second longitudinal post. Each fixture includes a pair of legs and couples the platform to an engine head. Further, each fixture includes a web structure having a central portion and a plurality of stems connecting to the pair of legs.

20 Claims, 10 Drawing Sheets

SUPPORT STRUCTURE FOR SUPPORTING A CONDUIT OF AN ENGINE

TECHNICAL FIELD

The present disclosure generally relates to an engine, and more particularly, to a support structure for supporting a conduit, for example, an intake conduit or an exhaust conduit of the engine.

BACKGROUND

Engines, such as internal combustion engines, generally include an intake conduit and an exhaust conduit. An intake conduit draws air into the engine to facilitate combustion, while an exhaust conduit vents combustion gases out of the engine. Often such conduits are mounted to an engine block of the engine to reduce space. However, supporting the intake and exhaust conduits generally adds to the bulk of the engine, and increases overall engine weight. Additionally, such support structures make it difficult to service the engine.

SUMMARY

In one aspect, the disclosure is directed towards a support structure for supporting a conduit of an engine. The engine includes an engine head and an engine block. The support structure includes a bracket assembly having a platform, a pair of brackets, and a pair of fixtures. The platform is configured to extend parallel to the conduit and support the conduit. The platform has a first side and a second side disposed parallel to the first side and spaced apart from the first side. The pair of brackets are configured to be coupled to the first side. Each bracket includes a first lateral post configured to be coupled to the platform, and a second lateral post configured to be coupled to the engine block. Further, each bracket includes a first longitudinal post and a second longitudinal post, each extending from the first lateral post to the second lateral post. Also, a lateral distance between the first longitudinal post and the second longitudinal post increases in a direction away from the first lateral post towards the second lateral post. Each bracket also includes a stiffener connecting the first longitudinal post and the second longitudinal post. The pair of fixtures are configured to be coupled to the second side. Each fixture includes a pair of legs disposed spaced apart from each other and is configured to couple the platform to the engine head. Further, each fixture includes a web structure having a central portion and a plurality of stems connecting to the pair of legs.

In another aspect, the disclosure relates to an engine. The engine includes an engine block defining a plurality of cylinders, an engine head coupled to the engine block, a conduit coupled to the plurality of cylinders and configured to facilitate an entry or an exit of gases from the plurality of cylinders, and a support structure for supporting the conduit. The support structure includes a bracket assembly having a platform, a pair of brackets, and a pair of fixtures. The platform extends parallel to the conduit and supports the conduit. The platform has a first side and a second side disposed parallel to the first side and spaced apart from the first side. The pair of brackets are coupled to the first side. Each bracket includes a first lateral post coupled to the platform, and a second lateral post coupled to the engine block. Each bracket further includes a first longitudinal post and a second longitudinal post, each extending from the first lateral post to the second lateral post. A lateral distance between the first longitudinal post and the second longitudinal post increases in a direction away from the first lateral post toward the second lateral post. Furthermore, each bracket includes a stiffener connecting the first longitudinal post and the second longitudinal post. The pair of fixtures are coupled to the second side. Each fixture includes a pair of legs disposed spaced apart from each other and is coupled to the platform. Each fixture also includes a web structure having a central portion and a plurality of stems connected to the pair of legs.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
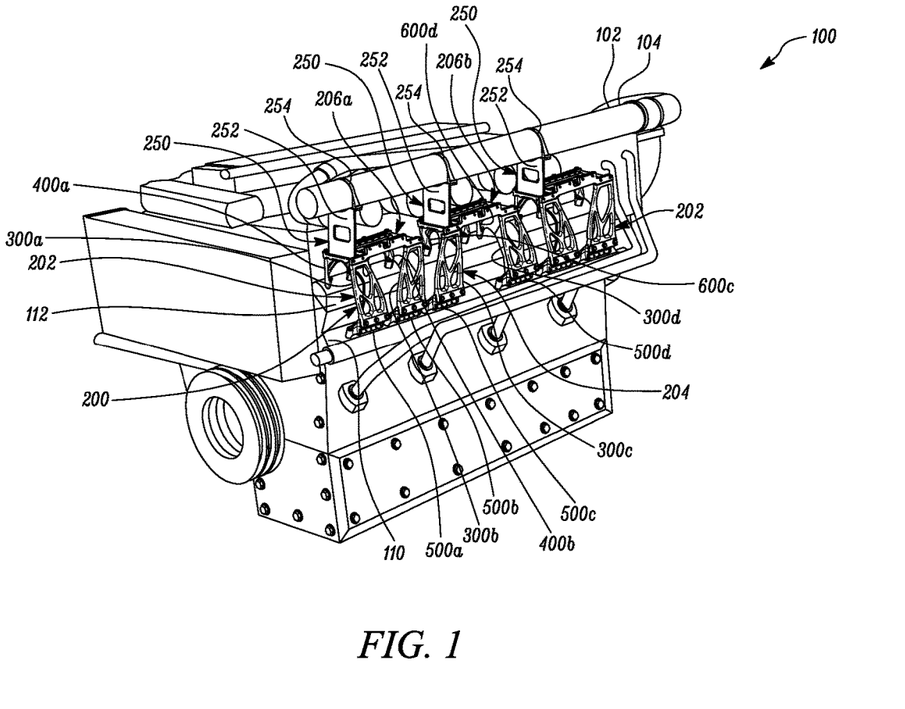
FIG. 1 is an exemplary engine including an exemplary support structure supporting an intake conduit, in accordance with an embodiment of the present disclosure.
Figure 2:
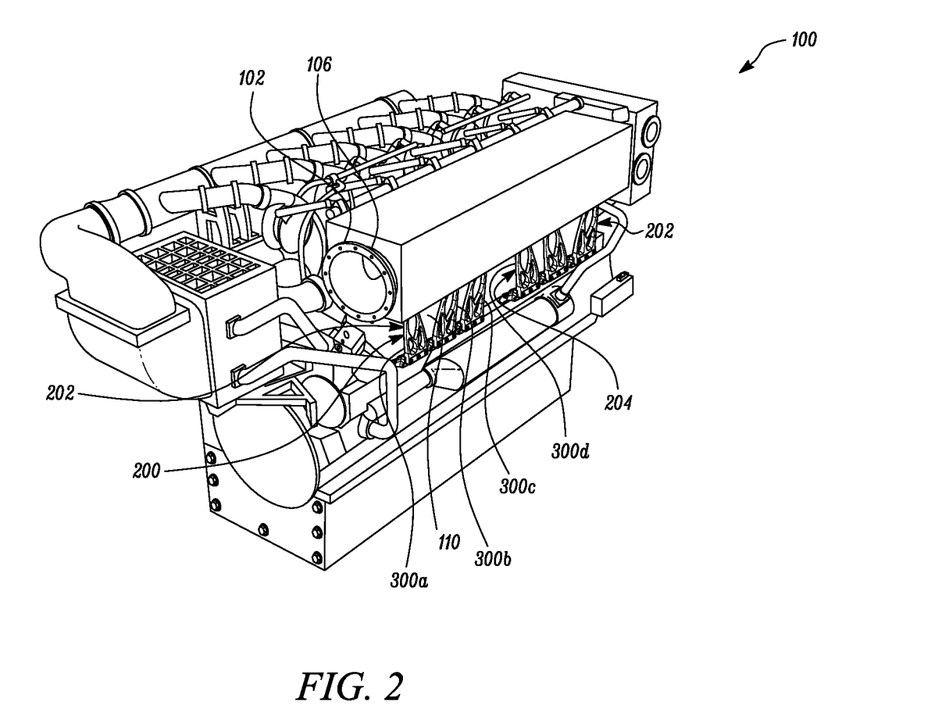
FIG. 2 is the engine including an exemplary support structure supporting an exhaust conduit, in accordance with an embodiment of the present disclosure.

FIGS. 1 and 2 illustrate an exemplary engine 100 incorporating a support structure 200 for supporting a conduit 102, for example, an intake conduit 104 (shown in FIG. 1) or an exhaust conduit 106 (shown in FIG. 2) of the engine 100. The engine 100 may be an internal combustion engine configured to power moving or stationary machines, for example generators, construction machines, mining machines, earthmoving machines, machines related to marine applications, such as ships, etc. The engine 100 may include an engine block 110 defining a plurality of bores (not shown), and an engine head 112 coupled to the engine block 110. The plurality of bores and the engine head 112 together define a plurality of cylinders (not shown) of the engine 100 in which combustion of a fuel may occur to generate power. To facilitate combustion of the fuel in one or more of the cylinders, the intake conduit 104 delivers air into combustion chambers (not shown) of the one or more cylinders, while the exhaust conduit 106 releases exhaust gases from the combustion chambers of the one or more cylinders of the engine 100 to an atmosphere.

Figure 3:
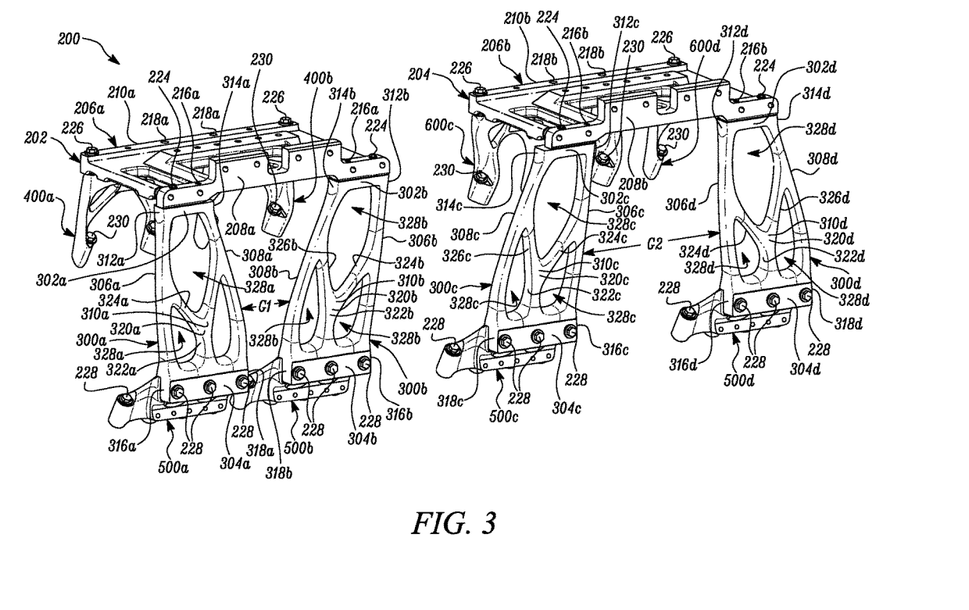
FIG. 3 is a front view of a first bracket assembly and a second bracket assembly of the support structure, in accordance with an embodiment of the present disclosure.
Figure 5:
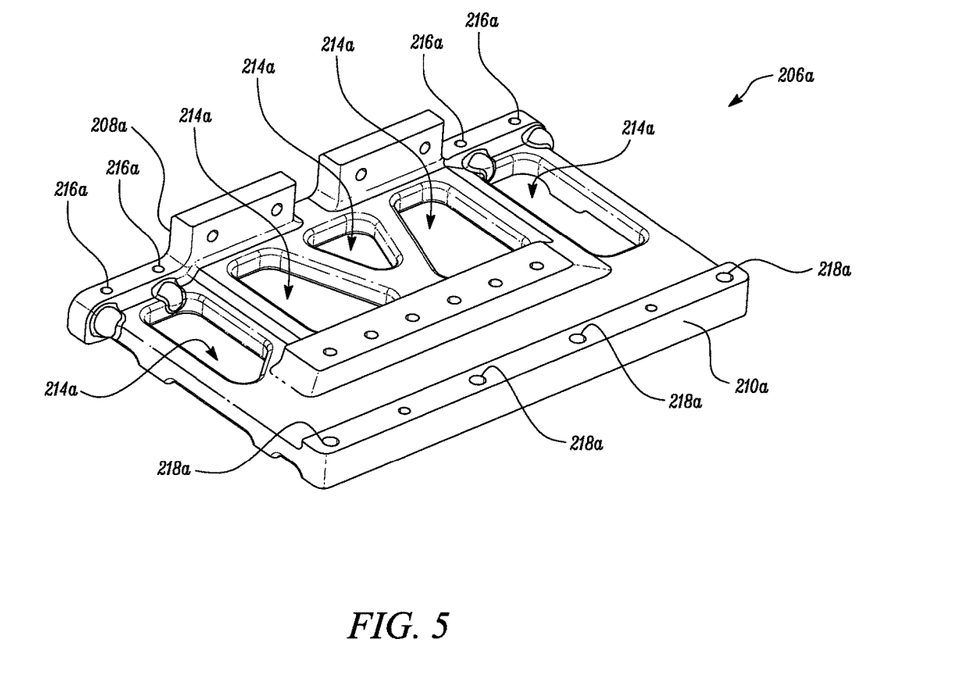
FIG. 5 is a perspective view of a first platform of the first bracket assembly, in accordance with an embodiment of the present disclosure.

Referring to FIGS. 1 and 3, the support structure 200 includes one or more bracket assemblies, for example a first bracket assembly 202 and a second bracket assembly 204 for supporting the intake conduit 104. The first bracket assembly 202 includes a platform 206a (hereinafter referred to as a first platform 206a) configured to support the intake conduit 104. Referring to FIGS. 1, 3, and 5, the first platform 206a extends parallel to the intake conduit 104, and has a first side 208a and a second side 210a disposed parallel to the first side 208a and spaced apart from the first side 208a. Each of the first side 208a and the second side 210a may extend parallel to the intake conduit 104, the first side 208a being disposed away from the engine head 112 relative to the second side 210a. The first platform 206a may include a rectangular structure. The first platform 206a may define one or more apertures 214a in a variety of shapes and configurations. The first platform 206a may further define a plurality of first fastening holes 216a disposed on the first side 208a and a plurality of second fastening holes 218a disposed on the second side 210a.

The first bracket assembly 202 further includes a pair of brackets, for example, a first bracket 300a and a second bracket 300b, each coupled to the first side 208a of the first platform 206a. The first bracket 300a and the second bracket 300b may be similar in structure, construction, form, and assembly, with the first platform 206a and the engine block 110. It may be appreciated that as such, unless otherwise noted, elements, features, and other characteristics, as discussed herein which are common to and shared by both the first bracket 300a and the second bracket 300b will include corresponding reference numbers (except that reference characters "a" and "b" will be used to identify or designate the first bracket 300a and the second bracket 300b, respectively). For the sake of clarity and brevity, the structure and the assembly of only the first bracket 300a is described in detail.

Figure 6:
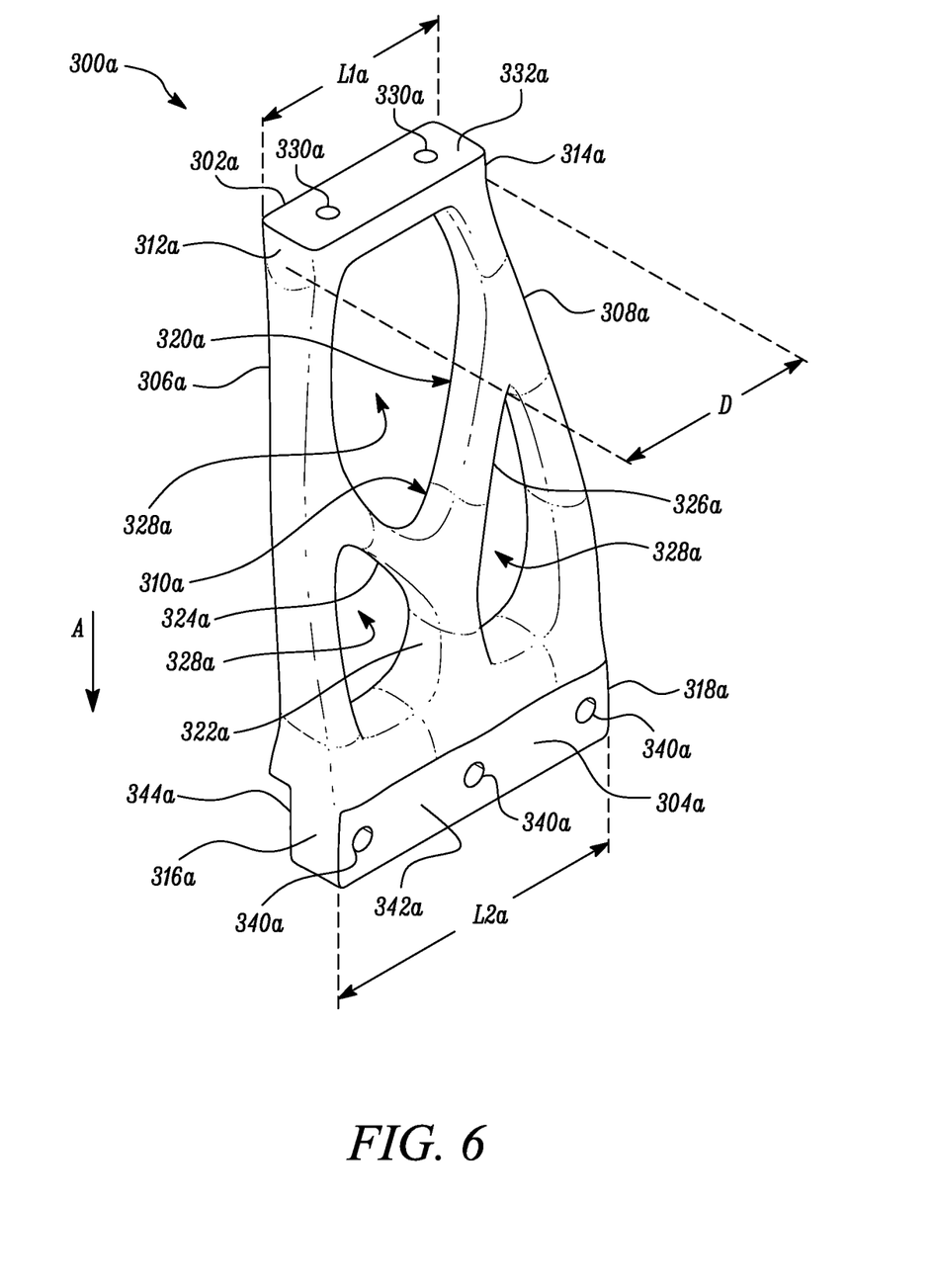
FIG. 6 is a perspective view of a first bracket of the first bracket assembly, in accordance with an embodiment of the present disclosure.

Referring to FIGS. 1, 3, and 6, the first bracket 300a includes a first lateral post 302a, a second lateral post 304a, a first longitudinal post 306a, a second longitudinal post 308a, and a stiffener 310a. The first lateral post 302a is coupled to the first side 208a of the first platform 206a when the first bracket 300a is assembled with the first platform 206a. The second lateral post 304a is coupled to the engine block 110, and is disposed at a distance from the first lateral post 302a. In an embodiment, both the first lateral post 302a and the second lateral post 304a may be disposed substantially parallel to each other. The first lateral post 302a may include a first end 312a and a second end 314a. Similarly, the second lateral post 304a may include a first end 316a and a second end 318a. In an embodiment, a length 'L1a' of the first lateral post 302a may be smaller than a length 'L2a' of the second lateral post 304a.

The first longitudinal post 306a extends from the first lateral post 302a to the second lateral post 304a, and may connect the first end 312a of the first lateral post 302a to the first end 316a of the second lateral post 304a. Also, the second longitudinal post 308a extends from the first lateral post 302a to the second lateral post 304a, and may connect the second end 314a of the first lateral post 302a to the second end 318a of the second lateral post 304a. In certain embodiments, each of the first longitudinal post 306a and the second longitudinal post 308a may be a curved post. The first longitudinal post 306a is disposed at a distance from the second longitudinal post 308a such that a lateral distance 'D' between the first longitudinal post 306a and the second longitudinal post 308a increases in a direction 'A' away from the first lateral post 302a towards the second lateral post 304a. To facilitate such a variation of the lateral distance 'D' between the first longitudinal post 306a and the second longitudinal post 308a, in some implementations, the first end 312a of the first lateral post 302a may be disposed directly below the first end 316a of the second lateral post 304a, while the second end 318a of the second lateral post 304a may be disposed below and at a lateral distance from the second end 314a of the first lateral post 302a.

The stiffener 310a connects the first longitudinal post 306a and the second longitudinal post 308a, and is configured to provide additional strength, for example, a bending strength, to the first bracket 300a. In an implementation, the stiffener 310a may include a Y-shaped stiffener 320a coupling the first longitudinal post 306a to the second longitudinal post 308a and the second lateral post 304a. In such a case, the Y-shaped stiffener 320a may include a stem member 322a extending from the second lateral post 304a, a first branch member 324a extending from the stem member 322a to the first longitudinal post 306a, and a second branch member 326a extending from the stem member 322a to the second longitudinal post 308a. In an embodiment, the stiffener 310a (Y-shaped stiffener 320a) may define a plurality of gaps 328a between the longitudinal posts 306a, 308a and the lateral posts 302a, 304a.

The first bracket 300a may further include a plurality of first holes 330a (best shown in FIG. 6), each receiving a connector 224 for coupling the first bracket 300a to the first platform 206a. In an embodiment, each first hole 330a is defined by the first lateral post 302a and extends from a first surface 332a of the first lateral post 302a into a body of the first lateral post 302a in a direction of extension of the longitudinal posts 306a, 308a. In an embodiment, the connector 224 may be a fastener for coupling the first lateral post 302a (the first bracket 300a) to the first side 208a of the first platform 206a. The first platform 206a and the first bracket 300a are coupled by aligning the first fastening holes 216a of the first platform 206a to the first holes 330a of the first bracket 300a, and inserting the connectors 224 in each first fastening hole 216a and each first hole 330a.

The first bracket 300a may further include a plurality of second holes 340a, each configured to receive connectors 224 to facilitate a coupling of the first bracket 300a to the engine block 110. In an embodiment, each second hole 340a may be defined by the second lateral post 304a, and may extend from a first surface 342a of the second lateral post 304a to a second surface 344a of the second lateral post 304a through a width of the second lateral post 304a. In an embodiment, each second hole 340a may extend in a direction perpendicular to a direction of extension of both the longitudinal posts 306a, 308a and the lateral posts 302a, 304a.

Similar to the first bracket 300a, the second bracket 300b includes a first lateral post 302b having a first end 312b and a second end 314b, a second lateral post 304b having a first end 316b and a second end 318b, a first longitudinal post 306b, a second longitudinal post 308b, and a stiffener 310b. The stiffener 310b may include a Y-shaped stiffener 320b having a stem member 322b, a first branch member 324b, and a second branch member 326b. The stiffener 310b (Y-shaped stiffener 320b) may define a plurality of gaps 328b between the longitudinal posts 306b, 308b and the lateral posts 302b, 304b. Further, similar to the first bracket 300a, the second bracket 300b may include a plurality of first holes (not shown), each receiving a connector 224 for coupling the second bracket 300b to the first side 208a of the first platform 206a, and a second plurality of holes (not shown), each receiving a connector 224 for coupling the second bracket 300b to the engine block 110.

Figure 4:
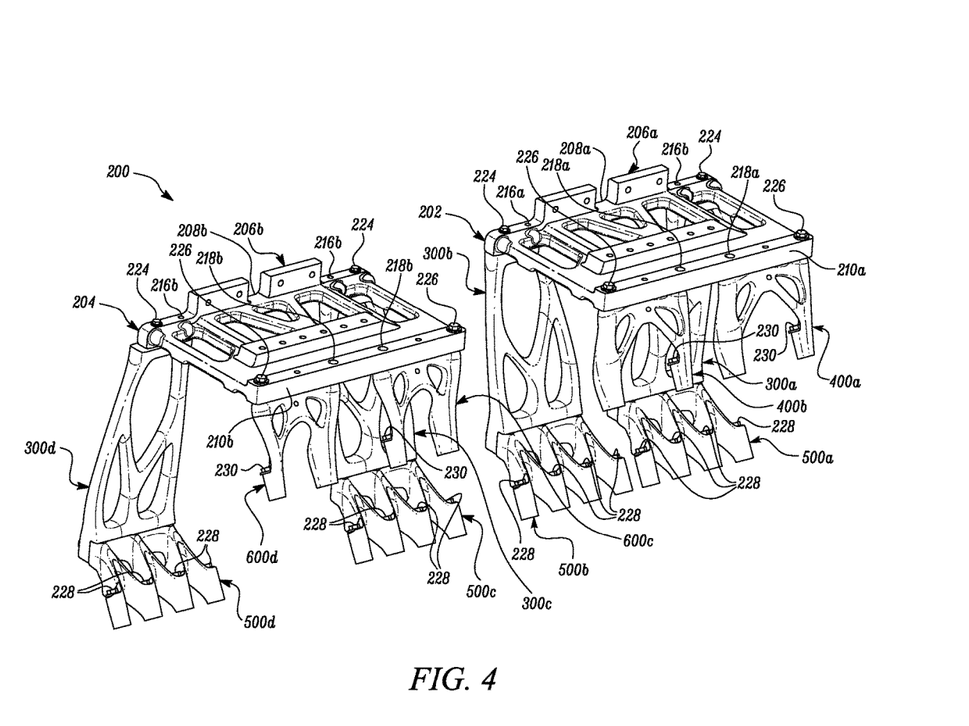
FIG. 4 is a rear view of the first bracket assembly and the second bracket assembly of the support structure, in accordance with an embodiment of the present disclosure.

Referring to FIGS. 1 and 4, the first bracket assembly 202 further includes a pair of fixtures, for example, a first pair of fixtures coupled to the second side 210a of the first platform 206a. The first pair of fixtures includes a first fixture 400a and a second fixture 400b, each coupled to the second side 210a of the first platform 206a. The second fixture 400b is disposed at a distance from the first fixture 400a when the first fixture 400a and the second fixture 400b are assembled with the first platform 206a. The first fixture 400a and the second fixture 400b are identical in structure, construction, form, and assembly, with the first platform 206a and the engine head 112. For the sake of clarity and brevity, the structure and the assembly of only the first fixture 400a is described in detail.

Figure 7:
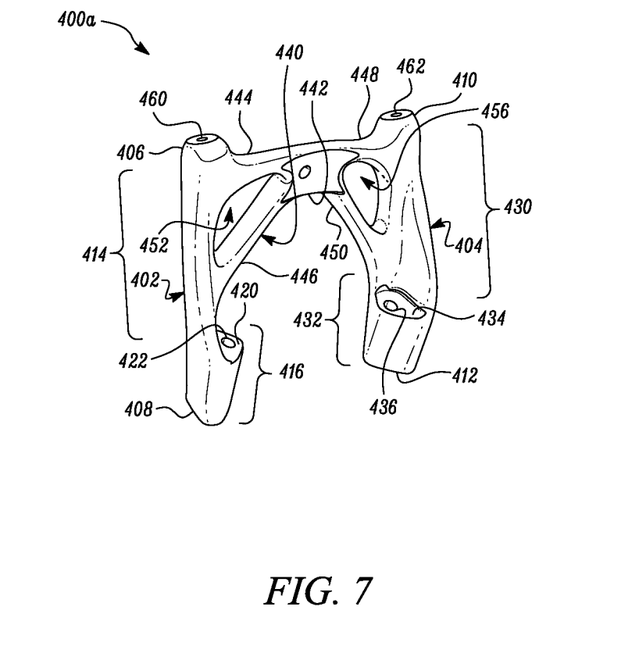
FIG. 7 is a perspective view of a first fixture of the first bracket assembly, in accordance with an embodiment of the present disclosure.

Referring to FIGS. 1, 4, and 7, the first fixture 400a includes a pair of legs, for example, a first leg 402 and a second leg 404 disposed spaced apart from first leg 402. Each of the first leg 402 and the second leg 404 couples the first platform 206a to the engine head 112. The first leg 402 may include a first end 406 coupled to the second side 210a of the first platform 206a, and a second end 408 coupled to the engine head 112. Similarly, the second leg 404 may include a first end 410 coupled to the second side 210a of the first platform 206a, and a second end 412 coupled to the engine head 112.

The first leg 402 may include a first portion 414 and a stepped portion 416. The first portion 414 may extend from the first end 406 to the stepped portion 416, and the stepped portion 416 may extend from the first portion 414 to the second end 408. The stepped portion 416 may define a step 420 at an interface of the first portion 414 and the stepped portion 416. In an embodiment, the stepped portion 416 defines a through-hole 422 for receiving a fastener 226 for facilitating a coupling of the first fixture 400a to the engine head 112. In an embodiment, the through-hole 422 extends from the step 420 to the second end 408 of the first leg 402.

Similar to the first leg 402, the second leg 404 may include a first portion 430 and a stepped portion 432. The first portion 430 may extend from the first end 410 to the stepped portion 432, and the stepped portion 432 may extend from the first portion 430 to the second end 412. The stepped portion 432 may define a step 434 at an interface of the first portion 430 and the stepped portion 432. In an embodiment, the stepped portion 432 defines a through-hole 436 for receiving a fastener 226 for facilitating a coupling of the first fixture 400a to the engine head 112. In an embodiment, the through-hole 436 extends from the step 434 to the second end 412 of the second leg 404. In an embodiment, the stepped portion 416 of the first leg 402 is directed towards the stepped portion 432 of the second leg 404. In certain implementations, the stepped portions 416, 432 are directed toward each other such that both the steps 420, 434 are located in a space defined between the legs 402, 404.

The first fixture 400a further includes a web structure 440 having a central portion 442 and a plurality of stems, for example, a first stem 444, a second stem 446, a third stem 448, and a fourth stem 450, each connected to the pair of legs 402, 404 and extending from the central portion 442. As shown, each of the first stem 444 and the second stem 446 may connect the central portion 442 to the first leg 402, while each of the third stem 448 and the fourth stem 450 may connect the central portion 442 to the second leg 404. The first stem 444 may extend from the central portion 442, and may be connected proximate to the first end 406, while the second stem 446 may extend from the central portion 442, and may connect to the first portion 414 of the first leg 402 proximate to the stepped portion 416 of the first leg 402. The first stem 444 and the second stem 446 together define a first gap 452 therebetween. The third stem 448 may extend from the central portion 442, and may be connected proximate to the first end 410 of the second leg 404, while the fourth stem 450 may extend from the central portion 442, and may be connected to the first portion 430 of the second leg 404 proximate to the stepped portion 432 of the second leg 404. The third stem 448 and the fourth stem 450 together may define second gap 456 therebetween.

The first fixture 400a may further include a first hole 460 defined by the first leg 402 and extending from the first end 406 into the first portion 414 of the first leg 402. The first hole 460 is configured to receive a fastener 226 for coupling the first fixture 400a to the first platform 206a. The first fixture 400a may also include a second hole 462 defined by the second leg 404 and extending from the first end 410 into the first portion 430 of the second leg 404. The second hole 462 is configured to receive a fastener 226 for coupling the first fixture 400a to the first platform 206a. The first platform 206a and the first fixture 400a are coupled by aligning the second fastening holes 218a of the first platform 206a to the first hole 460 and the second hole 462, and inserting the fasteners 226 in the second fastening holes 218a, the first hole 460 and the second hole 462.

Referring to FIGS. 1 and 4, the first bracket assembly 202 may further include a pair of couplers, for example a first coupler 500a and a second coupler 500b for respectively coupling the first bracket 300a and the second bracket 300b to the engine block 110. The first coupler 500a may be identical in structure, construction, and form to the second coupler 500b. Further, the second coupler 500b may be identical in assembly with the second bracket 300b and the engine block 110 as that of the assembly of the first coupler 500a with the first bracket 300a and the engine block 110. For the sake of clarity and brevity, the structure and the assembly of only the first coupler 500a is described in detail.

Referring to FIGS. 1, 3, 4, 8, and 9, the first coupler 500a may include a base portion 502 and a plurality of branched extensions extending away from the base portion 502. The base portion 502 is coupled to the second lateral post 304a of the first bracket 300a for coupling the first bracket 300a to the engine block 110. In an exemplary embodiment, four branched extensions, namely a first branched extension 504, a second branched extension 506, a third branched extension 508, and a fourth branched extension 510, are shown. The second branched extension 506 and the third branched extension 508 may be disposed between the first branched extension 504 and the fourth branched extension 510. Each of the two outer branched extensions 504, 510 (i.e., the first branched extension 504 and the fourth branched extension 510) may include a leg structure 512 and a stepped structure 514. The leg structure 512 extends from the base portion 502 to the stepped structure 514, while the stepped structure 514 extends from the leg structure 512 to an end of the respective branched extensions 504, 510. As shown, the leg structure 512 of each of two outer branched extensions 504, 510 may include single leg. Further, each stepped structure 514 of each of the two outer branched extensions 504, 510 defines a fastening hole 516 for receiving a fastener 228 for coupling the respective branched extensions 504, 510 to the engine block 110.

Figure 8:
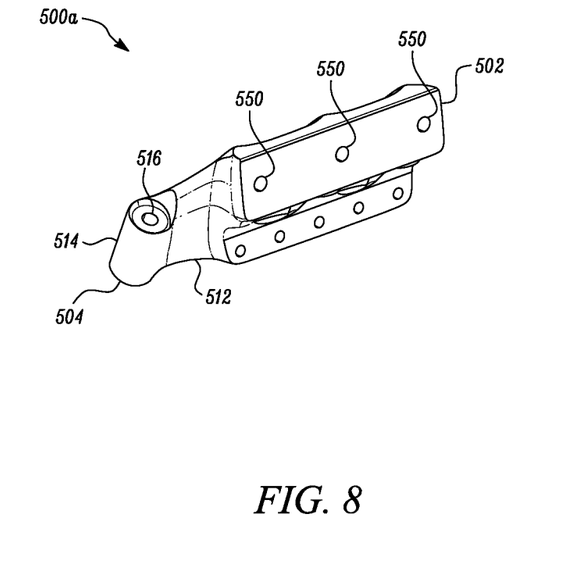
FIG. 8 is a front perspective view of a first coupler of the first bracket assembly, in accordance with an embodiment of the present disclosure.
Figure 9:
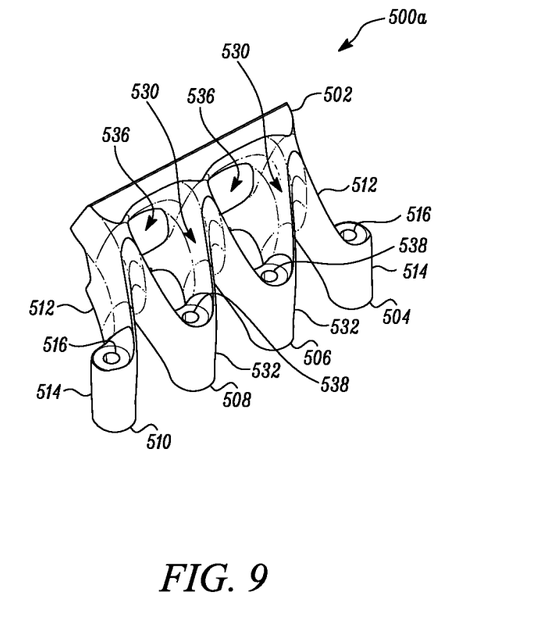
FIG. 9 is a rear perspective view of the first coupler of the first bracket assembly, in accordance with an embodiment of the present disclosure.

Each of the two inner branched extensions 506, 508 (i.e., the second branched extension 506 and the third branched extension 508) may include a leg structure 530 and a stepped structure 532. The leg structure 530 extends from the base portion 502 to the stepped structure 532, while the stepped structure 532 extends from the leg structure 530 to an end of the respective branched extensions 506, 508. As shown, the leg structure 530 of each of two inner branched extensions 506, 508 may include two legs meeting at the respective stepped structure 532 and defining a cavity 536 therebetween. Each stepped structure 532 defines a fastening hole 538 for receiving a fastener 228 for coupling the branched extensions 506, 508 to the engine block 110. Further, the base portion 502 defines a plurality of openings 550 for receiving fasteners 228 for coupling the base portion 502 to the second lateral post 304a of the first bracket 300a.

In the first bracket assembly 202, the first bracket 300a and the second bracket 300b are arranged in side by side manner to define a first gap 'G1', between them. The first bracket 300a and the second bracket 300b are disposed such that the second longitudinal post 308a of the first bracket 300a is disposed adjacent to the second longitudinal post 308b of the second bracket 300b and the first gap 'G1' is defined between the second longitudinal post 308a of the first bracket 300a and the second longitudinal post 308b of the second bracket 300b. As shown, the first gap 'G1' decreases in a direction (direction 'A') away from the first platform 206a, i.e., a distance between the second longitudinal post 308a of the first bracket 300a and the second longitudinal post 308b of the second bracket 300b is greater in proximity to the first platform 206a than a distance between the second longitudinal post 308a of the first bracket 300a and the second longitudinal post 308b of the second bracket 300b in proximity to the couplers 500a, 500b.

The second bracket assembly 204 may include a platform 206b (hereinafter referred to as a second platform 206b), a pair of brackets, for example, a third bracket 300c and a fourth bracket 300d, a second pair of fixtures having a third fixture 600c and a fourth fixture 600d, and a pair of couplers, for example, a third coupler 500c and a fourth coupler 500d. In an embodiment, the second bracket assembly 204 may be disposed adjacent to the first bracket assembly 202 and may be coupled to the engine block 110 and the engine head 112 for providing support to the intake conduit 104.

Also, the second platform 206b is identical in structure, construction, and form, to the first platform 206a. It may be appreciated that as such, unless otherwise noted, elements, features, and other characteristics as discussed herein which are common to and shared by the first platform 206a and the second platform 206b will include corresponding reference numbers (except that reference characters "a" and "b" will be used to identify or designate the first platform 206a and the second platform 206b respectively). Similar to the first platform 206a, the second platform 206b includes a first side 208b, a second side 210b, a plurality of first fastening holes 216b, a plurality of second fastening holes 218b, and a plurality of apertures 214b.

Both the third bracket 300c and the fourth bracket 300d are similar in structure, construction, and form, to the first bracket 300a. It may be appreciated that as such, unless otherwise noted, elements, features, and other characteristics as discussed herein which are common to and shared by the first bracket 300a, the third bracket 300c, and the fourth bracket 300d, will include corresponding reference numbers (except that reference characters "a", "c", and "d" will be used to identify or designate the first bracket 300a, the third bracket 300c, and the fourth bracket 300d, respectively).

Similar to the first bracket 300a, the third bracket 300c includes a first lateral post 302c having a first end 312c and a second end 314c, a second lateral post 304c having a first end 316c and a second end 318c, a first longitudinal post 306c, a second longitudinal post 308c, and a stiffener 310c. The stiffener 310c may include a Y-shaped stiffener 320c having a stem member 322c, a first branch member 324c, and a second branch member 326c. The stiffener 310c (Y-shaped stiffener 320c) may define a plurality of gaps 328c between the longitudinal posts 306c, 308c and the lateral posts 302c, 304c. Further, similar to the first bracket 300a, the third bracket 300c may include a plurality of first holes (not shown), each receiving a connector 224 for coupling the third bracket 300c to the first side 208b of the second platform 206b, and a second plurality of holes (not shown), each receiving a connector 224 for facilitating a coupling of the third bracket 300c to the engine block 110.

Similar to the third bracket 300c, the fourth bracket 300d includes a first lateral post 302d having a first end 312d and a second end 314d, a second lateral post 304d having a first end 316d and a second end 318d, a first longitudinal post 306d, a second longitudinal post 308d, and a stiffener 310d. The stiffener 310d may include a Y-shaped stiffener 320d having a stem member 322d, a first branch member 324d, and a second branch member 326d. The stiffener 310d (Y-shaped stiffener 320d) may define a plurality of gaps 328d between the longitudinal posts 306d, 308d and the lateral posts 302d, 304d. Further, similar to the third bracket 300c, the fourth bracket 300d may include a plurality of first holes (not shown), each receiving a connector 224 for coupling the fourth bracket 300d to the first side 208b of the second platform 206b, and a second plurality of holes (not shown), each receiving a connector 224 for facilitating a coupling the fourth bracket 300d to the engine block 110.

Further, an arrangement of the third bracket 300c and the fourth bracket 300d, in the second bracket assembly 204, differs from the arrangement of the first bracket 300a and the second bracket 300b in the first bracket assembly 202. In the second bracket assembly 204, the third bracket 300c and the fourth bracket 300d are disposed adjacent to each other in such a manner that the first longitudinal post 306c of the third bracket 300c is disposed adjacent to the first longitudinal post 306d of the fourth bracket 300d and a second gap 'G2' is defined between the first longitudinal post 306c of the third bracket 300c and the first longitudinal post 306d of the fourth bracket 300d.

Both the third coupler 500c and the fourth coupler 500d are identical in structure, construction, and form, to the first coupler 500a. The third coupler 500c and the fourth coupler 500d, respectively, couple the third bracket 300c and the fourth bracket 300d to the engine block 110. Further, the third coupler 500c may be identical in assembly with the third bracket 300c and the engine block 110 as that of the assembly of the first coupler 500a with the first bracket 300a and the engine block 110. Further, the fourth coupler 500d may be identical in assembly with the fourth bracket 300d and the engine block 110 as that of the assembly of the second coupler 500b with the second bracket 300b and the engine block 110.

The third fixture 600c and the fourth fixture 600d are coupled to the second side 210b of the second platform 206b, and are disposed at a distance from each other. The third fixture 600c and the fourth fixture 600d are identical in structure, construction, form, and assembly, with the second platform 206b and the engine head 112. For the sake of clarity and brevity, the structure and the assembly of only the third fixture 600c is described in detail.

Figure 10:
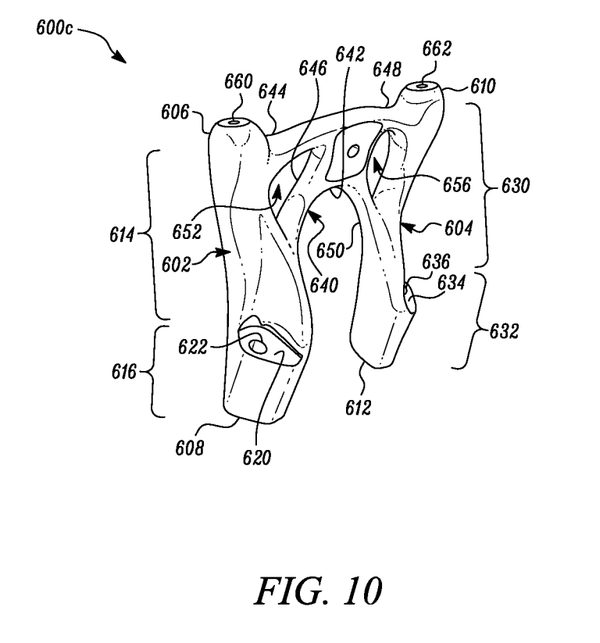
FIG. 10 is a perspective view of a third fixture of the second bracket assembly, in accordance with an embodiment of the present disclosure.

Referring to FIGS. 1, 4, and 10, the third fixture 600c includes a pair of legs, for example a first leg 602 and a second leg 604 disposed spaced apart from first leg 602. Each of the first leg 602 and the second leg 604 couples the second platform 206b to the engine head 112. The first leg 602 may include a first end 606 coupled to the second side 210b of the second platform 206b, and a second end 608 coupled to the engine head 112. Similarly, the second leg 604 may include a first end 610 coupled to the second side 210b of the second platform 206b, and a second end 612 coupled to the engine head 112.

The first leg 602 may include a first portion 614 and a stepped portion 616. The first portion 614 may extend from the first end 606 to the stepped portion 616, and the stepped portion 616 may extend from the first portion 614 to the second end 608. The stepped portion 616 may define a step 620 at an interface of the first portion 614 and the stepped portion 616. In an embodiment, the stepped portion 616 defines a through-hole 622 for receiving a fastener 230 for facilitating a coupling of the third fixture 600c to the engine head 112. In an embodiment, the through-hole 622 extends from the step 620 to the second end 608 of the first leg 602.

Similar to the first leg 602, the second leg 604 may include a first portion 630 and a stepped portion 632. The first portion 630 may extend from the first end 610 to the stepped portion 632, and the stepped portion 632 may extend from the first portion 630 to the second end 612. The stepped portion 632 may define a step 634 at an interface of the first portion 630 and the stepped portion 632. In an embodiment, the stepped portion 632 defines a through-hole 636 for receiving a fastener 230 for facilitating a coupling of the third fixture 600c to the engine head 112. In an embodiment, the through-hole 636 extends from the step 634 to the second end 612 of the second leg 604. In an embodiment, the stepped portion 616 of the first leg 602 is directed away from the stepped portion 632 of the second leg 604. In certain implementations, the stepped portions 616, 632 are directed away from each other such that both the steps 620, 634 are located outside a space defined between the legs 602, 604.

The third fixture 600c further includes a web structure 640 having a central portion 642 and a plurality of stems, for example, a first stem 644, a second stem 646, a third stem 648, and a fourth stem 650, each connected to the pair of legs 602, 604 and extending from the central portion 442. As shown, the first stem 644 and the second stem 646, each may connect the central portion 642 to the first leg 602, while the third stem 648 and the fourth stem 650, each may connect the central portion 642 to the second leg 604. The first stem 644 may extend from the central portion 642, and may be connected proximate to the first end 606, while the second stem 646 may extend from the central portion 642, and may connect to the first portion 614 of the first leg 602 proximate to the stepped portion 616 of the first leg 602. The first stem 644 and the second stem 646 together define a first gap 652 therebetween. The third stem 648 may extend from the central portion 642, and may be connected proximate to the first end 610 of the second leg 604, while the fourth stem 650 may extend from the central portion 642, and may be connected to the first portion 630 of the second leg 604 proximate to the stepped portion 632 of the second leg 604. The third stem 648 and the fourth stem 650 together may define a second gap 656 therebetween.

The third fixture 600c may further include a first hole 660 defined by the first leg 602 and extending from the first end 606 into the first portion 614 of the first leg 602. The first hole 660 is configured to receive a fastener 230 for coupling the third fixture 600c to the second platform 206b. The third fixture 600c may also include a second hole 662 defined by the second leg 604 and extending from the first end 610 into the first portion 630 of the second leg 604. The second hole 662 is configured to receive a fastener 230 for coupling the third fixture 600c to the second platform 206b. The second platform 206b and the third fixture 600c are coupled by aligning the second fastening holes 218b of the second platform 206b to the first hole 660 and the second hole 662, and inserting the fasteners 230 in the second fastening holes 218b, the first hole 660 and the second hole 662.

Again referring to FIG. 1, the support structure 200 may include one or more stand assemblies 250 for supporting the intake conduit 104. For example, three stand assemblies 250 are shown. Each stand assembly 250 may include a stand 252 coupled to the first platform 206a or second platform 206b. The stand 252 may extend upright and away from the first platform 206a of the first bracket assembly 202 or the second platform 206b of the second bracket assembly 204, toward the intake conduit 104. The stand 252 may be coupled to the first platform 206a or the second platform 206b by using fasteners. Further, each stand assembly 250 may include a band 254 to enwrap or clamp the intake conduit 104, and is coupled to the respective stand 252 for engaging the intake conduit 104 with the stand 252.

Further, in certain implementations, the stand assemblies 250 may be omitted. In such a case, the conduit 102 may be directly supported by the platforms 206a, 206b. For example, as illustrated in FIG. 2, for supporting the exhaust conduit 106 of the engine 100, one or more stand assemblies 250 have been omitted from the support structure 200.

Further, it may be appreciated that the support structure 200 may include any number of first bracket assemblies 202 and second bracket assemblies 204 to support the conduit 102 (i.e. the intake conduit 104 or the exhaust conduit 106) of the engine 100. For example, in the embodiment shown, the support structure 200 includes two first bracket assemblies 202 and a single second bracket assembly 204 arranged between the two first bracket assemblies 202. Further, it may be appreciated that, in certain implementations, the support structure 200 may include one or more first bracket assemblies 202 without having the second bracket assembly 204. In certain other implementations, the support structure 200 may only include one or more second bracket assemblies 204. Further, an arrangement of the first bracket assemblies 202 and the second bracket assemblies 204 that may differ from the arrangement shown in the drawings is also contemplated.

INDUSTRIAL APPLICABILITY

The support structure 200 is mounted to the engine block 110 and engine head 112 to provide support to the conduit 102, for example, the intake conduit 104 or the exhaust conduit 106, of the engine 100. The support structure 200, as explained above, includes a modular configuration, having various components with gaps that enable a service engineer or a technician to easily insert a tool through the brackets 300a, 300b, 300c, 300d, platforms 206a, 206b, etc., of the support structure 200, so as to access one or more engine components, thus facilitating an easy servicing of the engine 100. Further, the first bracket assembly 202 and/or the second bracket assembly 204 are arranged in such a manner to provide gaps such as the first gap 'G1' and the second gap 'G2' for easy access for an entry and an exit of the tool. Additionally, the various gaps and openings of the brackets 300a, 300b, 300c, 300d, fixtures 400a, 400b, 600c, 600d, couplers 500a, 500b, and the platforms 206a, 206b of the support structure 200 facilitate a circulation of air around the cylinders of the engine 100—thereby facilitating a cooling of the engine 100. Further, the modular configuration of the support structure 200 facilitates a removal of one or more components, such as, the first coupler 500a, for servicing the engine 100 without a need to disassemble the entire support structure 200. Further, the provision of the gaps and the openings also impart a reduced weight to the support structure 200, thereby making the support structure 200 relatively lightweight.

What is claimed is:

1. A support structure for supporting a conduit of an engine, the engine including an engine head and an engine block, the support structure comprising:
a bracket assembly, the bracket assembly including:
a platform configured to extend parallel to the conduit and support the conduit, the platform having a first side and a second side disposed parallel to the first side and spaced apart from the first side;
a pair of brackets configured to be coupled to the first side, each bracket including:
a first lateral post configured to be coupled to the platform;
a second lateral post configured to be coupled to the engine block;
a first longitudinal post and a second longitudinal post, each extending from the first lateral post to the second lateral post, wherein a lateral distance between the first longitudinal post and the second longitudinal post increases in a direction away from the first lateral post towards the second lateral post; and
a stiffener connecting the first longitudinal post and the second longitudinal post; and
a pair of fixtures configured to be coupled to the second side, each fixture including:
a pair of legs disposed spaced apart from each other and configured to couple the platform to the engine head; and
a web structure including a central portion and a plurality of stems connecting to the pair of legs.

2. The support structure of claim 1, wherein the bracket assembly is a first bracket assembly and the pair of brackets are arranged such that the second longitudinal post of one of the pair of brackets is disposed adjacent to the second longitudinal post of the other of the pair of brackets and define a first gap therebetween, wherein the first gap decreases in a direction away from the platform.

3. The support structure of claim 2, wherein the pair of fixtures is a first pair of fixtures and each leg of each fixture includes a stepped portion defining a through-hole for receiving a fastener for facilitating a coupling of the fixture to the engine head, wherein the stepped portion of one of the pair of legs is directed towards the stepped portion of an other of the pair of legs.

4. The support structure of claim 1, wherein the bracket assembly is a second bracket assembly and the pair of brackets are arranged such that the first longitudinal post of one of the pair of brackets is disposed adjacent to the first longitudinal post of an other of the pair of brackets and define a second gap therebetween.

5. The support structure of claim 4, wherein the pair of fixtures is a second pair of fixtures and each leg of each fixture includes a stepped portion defining a through-hole for receiving a fastener for facilitating a coupling of the fixture to the engine head, wherein the stepped portion of one of the pair of legs is directed towards the stepped portion of an other of the pair of legs.

6. The support structure of claim 1, wherein the stiffener includes a Y-shaped stiffener coupling the first longitudinal post to the second longitudinal post and the second lateral post.

7. The support structure of claim 1, wherein the bracket assembly further includes a pair of couplers, each coupler including:
a base portion configured to be coupled to the second lateral post of one of the pair of brackets; and
a plurality of branched extensions extending from the base portion, each branched extension configured to be coupled to the engine block.

8. The support structure of claim 7, wherein each branched extension includes a stepped structure defining a fastening hole for receiving a fastener for coupling the branched extension to the engine block.

9. The support structure of claim 1, wherein the conduit is an intake conduit, and the bracket assembly further includes one or more stand assemblies, each stand assembly including:
a stand configured to be coupled to the platform and extending towards the intake conduit and away from the bracket assembly; and
a band configured to enwrap the intake conduit and coupled to the stand for engaging the intake conduit with the stand.

10. The support structure of claim 1, wherein the conduit is an exhaust conduit.

11. An engine comprising,
an engine block defining a plurality of cylinders;
an engine head coupled to the engine block;
a conduit coupled to the plurality of cylinders and configured to facilitate an entry or an exit of gases from the plurality of cylinders; and
a support structure for supporting the conduit, the support structure including:
a bracket assembly, the bracket assembly including:
a platform extending parallel to the conduit and support the conduit, the platform having a first side and a second side disposed parallel to the first side and spaced apart from the first side;
a pair of brackets coupled to the first side, each bracket including:
a first lateral post coupled to the platform;
a second lateral post coupled to the engine block;
a first longitudinal post and a second longitudinal post, each extending from the first lateral post to the second lateral post, wherein a lateral distance between the first longitudinal post and the second longitudinal post increases in a direction away from the first lateral post toward the second lateral post; and
a stiffener connecting the first longitudinal post and the second longitudinal post; and
a pair of fixtures coupled to the second side, each fixture including:
a pair of legs disposed spaced apart from each other and coupled to the platform; and
a web structure including a central portion and a plurality of stems connected to the pair of legs.

12. The engine of claim 11, wherein the bracket assembly is a first bracket assembly and the pair of brackets are arranged such that the second longitudinal post of one of the pair of brackets is disposed adjacent to the second longitudinal post of the other of the pair of brackets and define a first gap therebetween, wherein the first gap decreases in a direction away from the platform.

13. The engine of claim 12, wherein the pair of fixtures is a first pair of fixtures and each leg of each fixture includes a stepped portion defining a through-hole for receiving a fastener for facilitating a coupling of the fixture to the engine head, wherein the stepped portion of one of the pair of legs is directed towards the stepped portion of an other of the pair of legs.

14. The engine of claim 11, wherein the bracket assembly is a second bracket assembly and the pair of brackets are arranged such that the first longitudinal post of one of the pair of brackets is disposed adjacent to the first longitudinal post of an other of the pair of brackets and defines a second gap therebetween.

15. The engine of claim 14, wherein the pair of fixtures is a second pair of fixtures and each leg of each fixture includes a stepped portion defining a through-hole for receiving a fastener for facilitating a coupling of the fixture to the engine head, wherein the stepped portion of one of the pair of legs is directed towards the stepped portion of an other of the pair of legs.

16. The engine of claim 11, wherein the stiffener includes a Y-shaped stiffener coupling the first longitudinal post to the second longitudinal post and the second lateral post.

17. The engine of claim 11, wherein the bracket assembly further includes a pair of couplers, each coupler including:
 a base portion configured to be coupled to the second lateral post of one of the pair of brackets; and
 a plurality of branched extensions extending from the base portion, each branched extension configured to be coupled to the engine block.

18. The engine of claim 17, wherein each branched extension includes a stepped structure defining a fastening hole for receiving a fastener for coupling the branched extension to the engine block.

19. The engine of claim 17, wherein the conduit is an intake conduit, and the bracket assembly further includes one or more stand assemblies, each stand assembly including:
 a stand coupled to the platform and extending toward the intake conduit and away from the bracket assembly; and
 a band enwrapping the intake conduit and coupled to the stand for engaging the intake conduit with the stand.

20. The engine of claim 17, wherein the conduit is an exhaust conduit.

* * * * *